(12) United States Patent
Wahl et al.

(10) Patent No.: US 11,919,471 B2
(45) Date of Patent: Mar. 5, 2024

(54) AIRBAG MODULE

(71) Applicants: ZF AUTOMOTIVE GERMANY GMBH, Alfdorf (DE); Audi AG, Ingolstadt (DE)

(72) Inventors: Marco Wahl, Sulzbach-Laufen (DE); Gerd Zischka, Schwäbisch Gmünd (DE)

(73) Assignees: ZF AUTOMOTIVE GERMANY GMBH, Alfdorf (DE); AUDI AG, Ingolstadt (DE)

( * ) Notice: Subject to any disclaimer, the term of this patent is extended or adjusted under 35 U.S.C. 154(b) by 19 days.

(21) Appl. No.: 17/441,325

(22) PCT Filed: Mar. 19, 2020

(86) PCT No.: PCT/EP2020/057603
§ 371 (c)(1),
(2) Date: Sep. 21, 2021

(87) PCT Pub. No.: WO2020/193361
PCT Pub. Date: Oct. 1, 2020

(65) Prior Publication Data
US 2022/0169200 A1    Jun. 2, 2022

(30) Foreign Application Priority Data
Mar. 22, 2019  (DE) .......................... 102019107366.9

(51) Int. Cl.
*B60R 21/231* (2011.01)
*B60R 21/2338* (2011.01)

(52) U.S. Cl.
CPC .... *B60R 21/23138* (2013.01); *B60R 21/2338* (2013.01); *B60R 2021/23107* (2013.01);
(Continued)

(58) Field of Classification Search
CPC ......... B60R 21/23138; B60R 21/2338; B60R 2021/23107; B60R 2021/23146;
(Continued)

(56) References Cited

U.S. PATENT DOCUMENTS

2004/0232675 A1* 11/2004 Marotzke .............. B60R 21/276
280/739
2006/0290118 A1   12/2006 Thomas
(Continued)

FOREIGN PATENT DOCUMENTS

DE    19703172 A1    8/1998
DE    19930196 A1    3/2000
(Continued)

OTHER PUBLICATIONS

J. Perez, DE 10 2019 127475, Airbag and Method, English Machine Translation, ip.com (Year: 2020).*
(Continued)

*Primary Examiner* — Karen Beck
(74) *Attorney, Agent, or Firm* — TAROLLI, SUNDHEIM, COVELL & TUMMINO L.L.P.

(57) ABSTRACT

An airbag module (10) for a restraint device (14) includes an airbag (24), in particular a seat-integrated side airbag, and a slidable actuator (40), wherein the airbag (24) has at least a first chamber (26) and at least a second chamber (28) which are fluidically connected to each other via a fluid communication, wherein the actuator (40) has a blocking position in which the fluid communication is blocked and a release position in which the fluid communication is released.

12 Claims, 8 Drawing Sheets

(52) U.S. Cl.
CPC ............... *B60R 2021/23146* (2013.01); *B60R 2021/23384* (2013.01)

(58) Field of Classification Search
CPC .. B60R 2021/23384; B60R 2021/2395; B60R 21/239
See application file for complete search history.

(56) References Cited

U.S. PATENT DOCUMENTS

| | | | | |
|---|---|---|---|---|
| 2009/0152846 | A1* | 6/2009 | Choi | B60R 21/2338 280/729 |
| 2010/0131197 | A1 | 5/2010 | Zhang et al. | |
| 2014/0246846 | A1* | 9/2014 | Anderson | B60R 21/2334 280/743.2 |
| 2014/0306433 | A1 | 10/2014 | Anderson et al. | |
| 2020/0122675 | A1* | 4/2020 | Perez | B60R 21/203 |
| 2021/0300285 | A1* | 9/2021 | Zischka | B60R 21/207 |

FOREIGN PATENT DOCUMENTS

| | | | | |
|---|---|---|---|---|
| DE | 19929046 | A1 | 1/2001 | |
| DE | 102005034250 | A1 | 2/2007 | |
| DE | 102008061986 | A1 | 6/2009 | |
| DE | 102008034239 | A1 * | 10/2009 | ........... B60R 21/233 |
| DE | 102019127475 | A1 * | 4/2020 | ........... B60R 21/203 |
| EP | 1834847 | A1 | 9/2007 | |
| EP | 3162640 | A1 | 3/2017 | |
| JP | 2010006237 | A | 1/2010 | |
| KR | 100252521 | B1 | 4/2000 | |
| WO | WO-2005070729 | A1 * | 8/2005 | ........... B60R 21/239 |
| WO | WO-2007045438 | A1 * | 4/2007 | ....... B60R 21/23138 |

OTHER PUBLICATIONS

D. Kruse, WO 2007/045438 Lateral impact protection device, English Machine Translation, ip.com. (Year: 2007).*
PCT International Search Report for corresponding International Application Serial No. PCT/EP2020/057603, dated May 15, 2020, pp. 1-4.

* cited by examiner

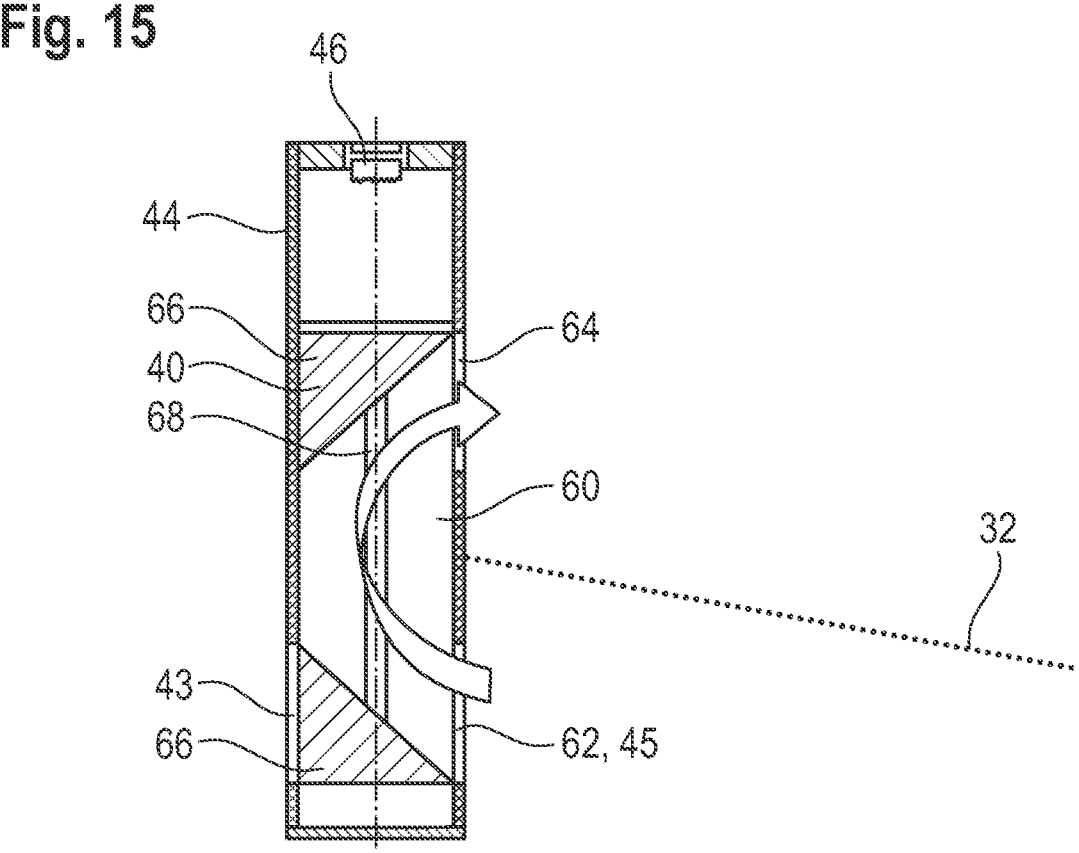

AIRBAG MODULE

RELATED APPLICATIONS

This application is a U.S. National Stage Application filed under 35 USC 371, claiming priority to Serial No. PCT/EP2020/057603, filed on 19 Mar. 2020; which claims priority from German Patent Application DE 10 2019 107 366.9, filed 22 Mar. 2019, the entireties of which are hereby incorporated herein by reference.

TECHNICAL FIELD

The invention relates to an airbag module for a restraint device.

BACKGROUND

Restraint devices comprising airbag modules are well-known and are commonly used in automotive vehicles to support a vehicle occupant in case of need.

In the future, the requirements to the flexibility of restraint devices will increase, because, when autonomous and/or automated driving will be increasingly widespread, a seating position adopted by the vehicle occupants may vary considerably more depending on the driving situation than is currently the case.

SUMMARY

Therefore, it is an object of the present invention to provide an airbag module for a restraint device adapted to support a vehicle occupant particularly safely in various seating positions.

According to the invention, this object is achieved by an airbag module for a restraint device, comprising an airbag, in particular a seat-integrated side airbag, and a movable actuator, wherein the airbag has at least a first chamber and at least a second chamber which are fluidically connected to each other via a fluid communication, wherein the actuator has a blocking position in which the fluid communication is blocked and a release position in which the fluid communication is released.

It is achieved in this way that, depending on the position of the actuator, in case of need either only the first chamber is inflated or the first and second chambers are inflated, when the airbag is inflated. Thus, a vehicle occupant can be appropriately supported by the airbag.

The position of the actuator is selected, for example, in response to a position of the respective vehicle seat, as usually a seating position of a vehicle occupant can be concluded from the position of the vehicle seat. That is, if a vehicle occupant is in a first relatively upright seating position, only the first chamber is inflated, and if the vehicle occupant is in a second reclined seating position, the first and second chambers are inflated.

According to one embodiment, the first chamber of the airbag is a shoulder chamber and the second chamber of the airbag is a head chamber. That is, the second chamber is disposed above the first chamber. The shoulder chamber is thus inflated in each case, if the airbag is inflated. The head chamber, on the other hand, is only inflated in specific seating positions of the vehicle occupant, for, if the vehicle occupant sits upright, the head chamber may happen to overlap a curtain side airbag. In this case, the different airbags would mutually overlap during inflation. By inflating the head chamber only if the actuator is in the release position, however, the airbag module can react in a particularly flexible manner to a driving situation, in particular to the seating position of the vehicle occupant.

The head chamber serves for protecting the head and the shoulder chamber serves for protecting the shoulder of the vehicle occupant.

The first chamber and the second chamber are separated from each other, for example, by a partition disposed inside the airbag. A partition helps divide the airbag into the first chamber and the second chamber in an especially simple and cost-efficient manner.

The partition may be fabricated from the same material as the airbag itself. Thus, the airbag can be easily folded and the partition is relatively small in the folded state of the airbag so that, in the folded state, the airbag is especially compact and can be properly accommodated in the vehicle.

Preferably, in the partition an overflow opening is provided that constitutes the fluid communication and is completely covered and fluidically sealed by a material layer, if the actuator is in the blocking position. An overflow opening helps especially simply realize a fluid communication. The overflow opening can be sealed by means of a material layer in a simple as well as cost-efficient manner.

The material layer is preferably disposed in the first chamber. When pressure builds up in the first chamber during inflation of the airbag and the actuator is in the blocking position, the material layer is thus pressed against the partition and seals the opening in an especially reliable manner.

According to one embodiment, the material layer is connected to the actuator via a tether and is maintained tensioned by the tether, if the actuator is in the blocking position. The tension is so strong that the overflow opening is reliably closed. In this way, the material layer is prevented from being drawn into the overflow opening or from twisting. This offers the advantage that the overflow opening is closed especially reliably, if the actuator is in the blocking position.

Preferably, the tether is detached from the actuator, if the actuator is in the release position. In this event, the material layer is no longer maintained tensioned. The fluid communication is especially released, because the material layer may move through the overflow opening, thereby releasing the overflow opening. In other words, the material layer can be pressed through the overflow opening, if the pressure in the first chamber increases during inflation of the airbag.

If a flow path between the first chamber and the second chamber is released, the second chamber is also inflated. The volume of the airbag in the inflated state then is significantly larger than if only the first chamber is inflated. In this way, in case of need a vehicle occupant can be reliably supported even in a reclined position.

On the actuator, for example, a pin is provided that engages, in the blocking position, in an eyelet of the tether and thus holds and tensions the tether. When the actuator moves to the release position, the pin is removed from the eyelet resulting in the tether being released.

Alternatively, the tether can be sheared off the actuator during inflation of the airbag, if the actuator is in a release position.

It is imaginable that a guide passage for the tether is provided on the partition. The guideway may be formed by a patch, in particular a strip-shaped patch, connected to the partition along its longitudinal edges. By guiding the tether inside the passage, the tether is maintained in a defined position. In particular, the tether is prevented from getting entangled when the airbag is folded or mounted, and reliable triggering of the airbag module is prevented from being possibly impaired.

According to another embodiment, a recess constituting the fluid communication is provided in the actuator. In this case, the overflow opening in the partition and the material layer that seals the overflow opening may be dropped. This offers the advantage that the airbag module has particularly few component parts and consequently is especially cost-efficient. In addition, the airbag module in this case is especially reliable, because the overflow opening is directly released by a movement of the actuator from the blocking position to the release position and no further components are interposed.

The recess may be an indentation or a passage in the actuator.

According to one embodiment, the airbag module includes a cylinder in which the actuator is movably disposed, the cylinder having a first opening that opens into the first chamber and having a second opening that opens into the second chamber, the recess fluidically connecting the openings to each other in the release position of the actuator. Thus, in the release position of the actuator, gas may flow through the cylinder from the first chamber into the second chamber.

The airbag module may include an outlet opening, the outlet opening being opened, if the actuator is in the blocking position, and the outlet opening being closed by the actuator, if the actuator is in the release position. In this way, the pressure inside the airbag can be governed and, resp., excess pressure can be avoided in the first chamber.

The outlet opening is provided in the cylinder, for example. A first opening of the cylinder may be aligned with the outlet opening. Thus, gas may flow out of the first chamber through the cylinder, with the more gas flowing out, the higher a pressure in the first chamber.

Preferably, the airbag module includes a gas generator that is fluidically connected to the first chamber. The airbag can be inflated by means of the gas generator in case of need.

For shifting the actuator from the blocking position to the release position, a secondary gas generator is provided, for example. The secondary gas generator may build up pressure in the cylinder, for example, thus causing the actuator to be shifted.

The fact whether the actuator is shifted depends on a position of the vehicle seat. Where necessary, the secondary gas generator is released simultaneously with the gas generator for inflating the airbag, for example. That is, a position of the vehicle seat is detected and, in response to the position, the secondary gas generator is released in case of need. For this purpose, e.g., a control unit is provided that detects a position of the vehicle seat and can control triggering of both the gas generator and the secondary gas generator.

Instead of simultaneously triggering the gas generator and the secondary gas generator, it is also imaginable for the secondary gas generator to be triggered, especially ignited, prior to the gas generator. For example, the secondary gas generator is ignited 5 ms prior to the gas generator.

BRIEF DESCRIPTION OF THE DRAWINGS

Further advantages and features of the invention will be evident from the following description and from the following drawings which are referred to and wherein:

FIG. 15 shows the airbag module according to FIG. 14 in the second state.

DESCRIPTION

Figure 1:
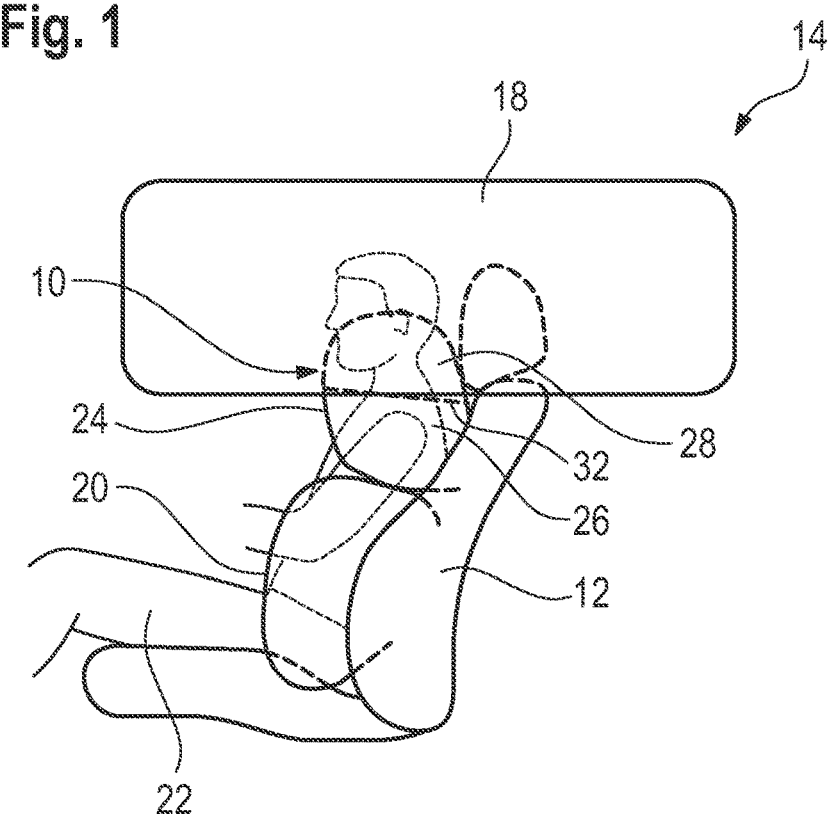
FIG. 1 schematically shows a vehicle seat including a restraint device that comprises an airbag module according to the invention, in a first seating position.

FIG. 1 schematically shows a vehicle seat 12 of an automotive vehicle comprising a restraint device 14. The restraint device 14 comprises plural airbag modules, wherein, apart from an airbag module 10 according to the invention, a curtain side airbag 18 and a seat-integrated side airbag 20 are illustrated in FIG. 1. The side airbag 20 is disposed below the airbag module 10 and ensures, for example, thorax and pelvis protection.

The airbag module 10 according to the invention is also configured as a seat-integrated side airbag in the shown embodiment. However, it is not limited to this embodiment.

FIG. 1 illustrates the vehicle seat 12 in a relatively upright position referred to as normal position in the following. Such position of the vehicle seat is usually adjusted when a vehicle occupant 22 him-/herself steers the automotive vehicle.

If the vehicle seat 12 is in the normal position, the airbag module 10 is suited to support the shoulder of the vehicle occupant 22 and to move the vehicle occupant 22 away from a side structure of the vehicle, in particular in the event of a so-called pre-crash activation. This helps minimize the risk of the vehicle occupant 22 getting injured.

Figure 2:
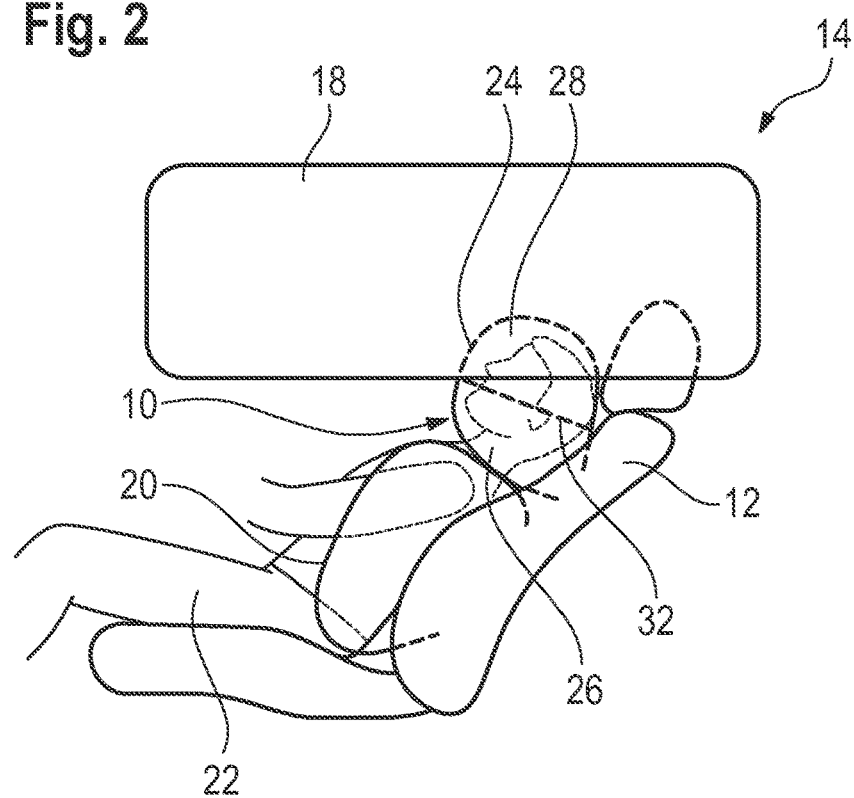
FIG. 2 schematically shows a vehicle seat including a restraint device that comprises an airbag module according to the invention, in a second seating position.

FIG. 2 illustrates a driving situation in which the vehicle seat 12 is shown in a second position enabling the vehicle occupant 22 to recline. Such seating position, which may also be referred to as comfort position, is imaginable, for example, when an automotive vehicle drives in an automated and/or autonomous manner and the vehicle occupant 22 him-/herself need not steer the vehicle. If the vehicle seat 12 is in the comfort position, the airbag module 10 is suited to protect the head of the vehicle occupant 22.

As is evident from FIG. 1, in the first seating position an overlapping between an airbag 24 of the airbag module 10 according to the invention and the curtain side airbag 18 is occurring, if the airbag modules 10, 18 are inflated in case of need. This is not desired, however, as in that case the airbag modules 10, 18 mutually affect their deployment behavior.

In a reclined seating position as illustrated in FIG. 2, on the other hand, complete inflation of the airbag 24 is desired to optimally support the head of the vehicle occupant 22 in case of need, because, in this seating position, the head of the vehicle occupant 22 is below the curtain side airbag.

For optimum support of the vehicle occupant 22 in every seating position the airbag 24 includes a first chamber 26 and a second chamber 28, as is evident from FIGS. 1 and 2. The first chamber 26 of the airbag 24 is a shoulder chamber and the second chamber 28 of the airbag 24 is a head chamber. For better illustration, the airbag 24 is shown separately in FIG. 3.

Depending on the seating position, in case of need either only the first chamber 26 can be inflated or the first and second chambers 26, 28 can be jointly inflated. In particular, in a first upright seating position as illustrated in FIG. 1, only the first chamber 26 is inflated. That is, the first chamber 26 is inflated in each case, but the second chamber 28 is only inflated if necessary.

Figure 3:
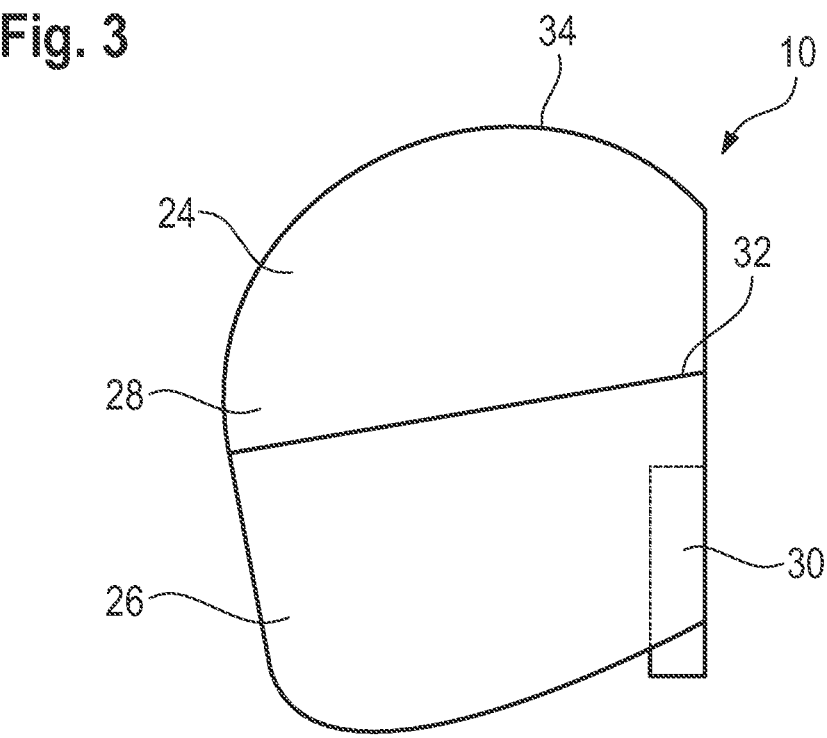
FIG. 3 schematically shows a first embodiment of an airbag module according to the invention, FIG. 4 schematically shows the airbag module according to FIG. 3 in a first state, FIG. 5 schematically shows the airbag module according to FIG. 3 in a second state.

Inflation of the airbag 24 in case of need is achieved, as usual, by means of a gas generator 30 shown in FIG. 3. In the shown embodiment, the gas generator 30 is fluid-communicated with the first chamber 26.

In order to separate the chambers 26, 28 from each other, inside the airbag 24 a partition 32 is disposed. In particular, the partition 32 is sewn or adhesively bonded to an outer wall 34 of the airbag 24. The partition 32 may be made from the same material as the airbag 24 itself.

Figure 4:
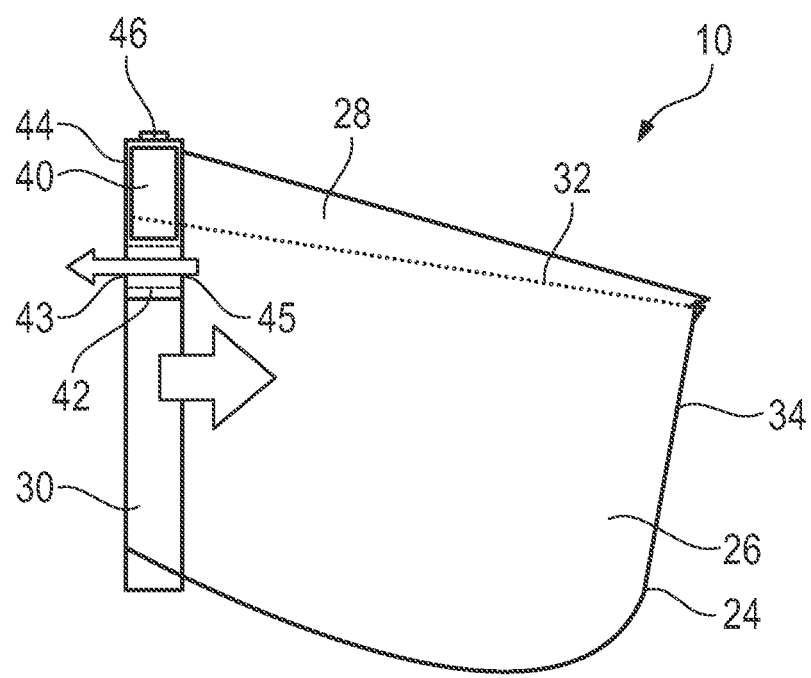
Figure 5:
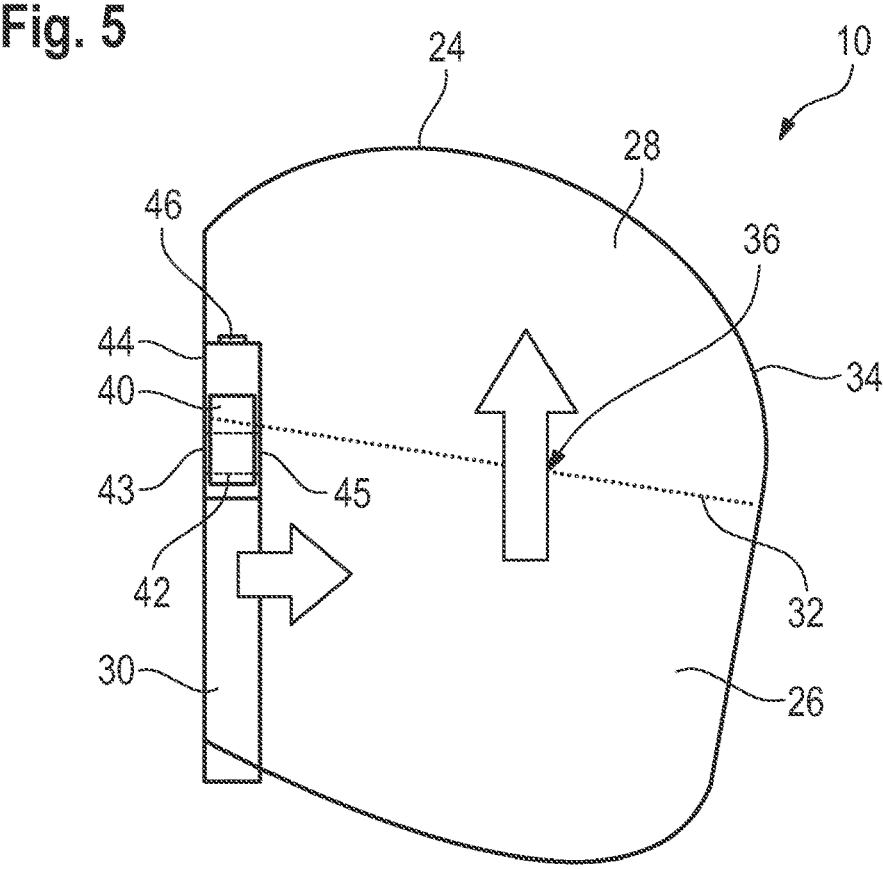

FIGS. 4 and 5 schematically illustrate an airbag module 10 according to the invention, wherein FIG. 4 shows the airbag 24 in a state in which only the first chamber 26 is inflated, and FIG. 5 shows the airbag 24 in a state in which the first and second chambers 26, 28 are inflated.

In order to enable gas to overflow from the first chamber 26 into the second chamber 28, if necessary, the first chamber 26 and the second chamber 28 are fluid-connected to each other via a fluid communication.

For this purpose, an overflow opening 36 is provided between the first chamber 26 and the second chamber 28 which, to simplify matters, is not shown in FIGS. 1 to 4 and which will be described in greater detail in the following.

The fluid communication may be blocked or released according to requirements.

The fluid communication from the first chamber 26 to the second chamber 28 is released by means of an actuator 40. The actuator 40 has a blocking position in which the fluid communication is blocked and a release position in which the fluid communication is released.

To allow the second chamber 28 to be inflated only if necessary, the airbag module 10 includes an outlet opening 42.

If the outlet opening 42 is opened, as illustrated in FIG. 4, only the first chamber 26 is inflated. Then gas flowing from the gas generator 30 into the first chamber 26 may flow out through the outlet opening 42, if the first chamber 26 is sufficiently inflated.

If the outlet opening 42 is closed, as illustrated in FIG. 5, the gas does not flow out of the airbag 24 through the outlet opening 42 but through the overflow opening 36 into the second chamber 28.

Preferably, the overflow opening 36 is opened when the outlet opening 42 is closed and is blocked when the outlet opening 42 is opened.

In the shown embodiments, the outlet opening 42 is opened by the actuator 40, if the actuator 40 is in the blocking position. If the actuator 40 is in the release position, the outlet opening 42 is closed.

Figure 6:
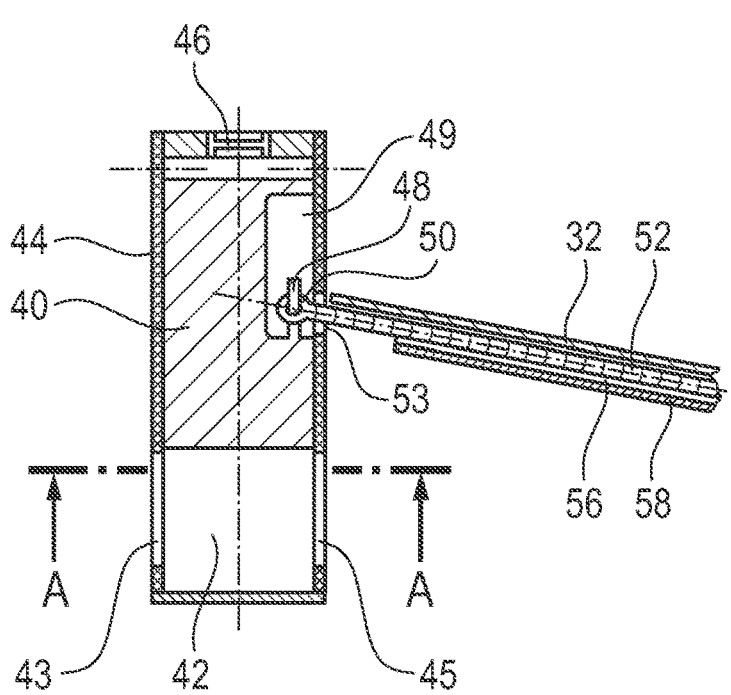
FIG. 6 shows a partial view of the airbag module according to FIG. 3 in the area of an actuator in the first state.

The actuator 40 is shown in detail in FIG. 6. For example, it is slidably supported in a cylinder 44, with the outlet opening 42 being also disposed in the cylinder 44. In particular, the outlet opening 42 is realized by two openings 43, 45 disposed to be aligned in the cylinder 44.

By shifting the actuator 40 within the cylinder 44 from the blocking position to the release position, the outlet opening 42 is closed by the actuator 40.

Preferably, for shifting the actuator 40 a secondary gas generator 46 is provided which is triggered when necessary and inside the cylinder 44 builds up pressure by which the actuator 40 is moved. The secondary gas generator 46 is triggered especially simultaneously with the gas generator 30, when necessary.

The question whether the secondary gas generator 46 is triggered, is especially dependent on the position of the vehicle seat 12. Preferably, the secondary gas generator 46 is not triggered, if the vehicle seat 12 is in the first upright position. If the vehicle seat 12 is in the second reclined position, the secondary gas generator 46 is triggered.

In order to control triggering of the secondary gas generator 46, e.g., a control unit is provided that is suited to detect the position of the vehicle seat 12 and, in case of need, to trigger the secondary gas generator 46 along with the gas generator 30.

The FIGS. 6 to 13 illustrate a first embodiment of the airbag module 10 according to the invention. Here the FIGS. 6 to 9 illustrate a state in which a fluid communication between the first chamber 26 and the second chamber 28 is blocked, and the FIGS. 10 to 13 illustrate a state in which a fluid communication between the first chamber 26 and the second chamber 28 is released.

FIG. 6 shows the actuator 40 supported in the cylinder 44 according to the first embodiment of the airbag module 10 in detail, the actuator 40 being in the blocking position.

In addition, a part of the partition 32 is visible in FIG. 6.

A pin 48 engaging in an eyelet 50 of a tether 52 is provided on the actuator 40. The pin 48 is disposed in an indentation 49 of the actuator 40. The tether 52 extends a little into the cylinder 44 through a recess 53 in the cylinder 44 so that engagement is possible between the pin 48 and the eyelet 50 of the tether 52.

The engagement with the pin 48 helps maintain the tether 52 tensioned.

Figure 7:
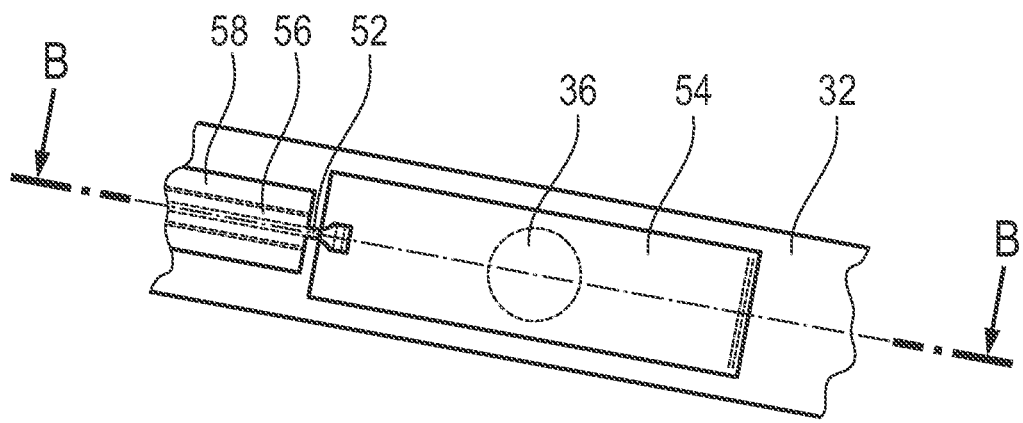
FIG. 7 shows another partial view of the airbag module according to FIG. 3 in the area of an overflow opening.
Figure 8:
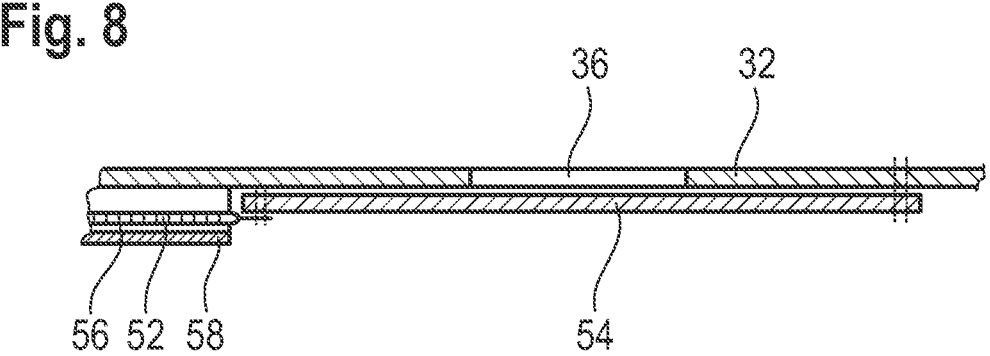
FIG. 8 shows a section along the line B-B in FIG. 7.
Figure 9:
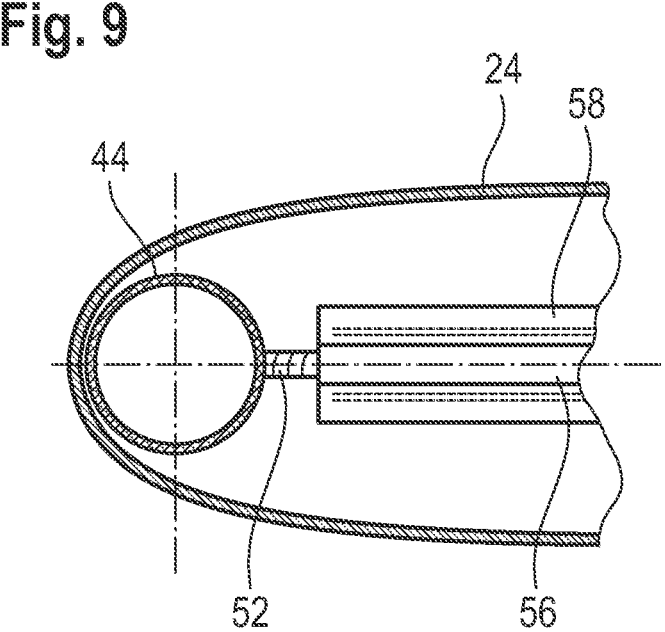
FIG. 9 shows a section along the line A-A in FIG. 6.

The tether 52 serves for releasing the overflow opening 36 as illustrated in the FIGS. 7, 8 and 9.

FIG. 7 illustrates the partition 32 in a top view.

For further illustration, in FIG. 8 a section along the line B-B of FIG. 7 is shown.

FIG. 9 illustrates a section along the line A-A from FIG. 6.

In the partition 32 the overflow opening 36 is disposed which constitutes the fluid communication via which gas may flow from the first chamber 26 into the second chamber 28.

If the actuator 40 is in the blocking position, the overflow opening 36 is completely covered and fluidically sealed by a material layer 54 so that no gas or only very little gas may flow from the first chamber 26 into the second chamber 28. As a consequence, when triggering the gas generator 30, only the first chamber 26 is inflated, if the actuator 40 is in the blocking position.

The material layer 54 is connected to the actuator 40 via the tether 52. In particular, the tether 52 is sewn or adhesively bonded to the material layer 54.

On the side of the overflow opening 36 remote from the tether 52, the material layer 54 is fastened, particularly sewn or adhesively bonded to the partition 32. Thus, the material layer 54 is maintained in a fixed position when the tether is tensioned.

Moreover, a guide passage 56 for the tether 52 is provided on the partition 32, wherein the tether 52 extends in a portion between the ends of the tether 52 in the guide passage 56. In this way, the tether 52 is prevented from getting entangled during folding or unfolding of the airbag 24.

The guide passage 56 is realized, for example, by an additional material layer 58 that is fastened, such as sewn or adhesively bonded, to the partition 32 along its longitudinal edges.

Figure 10:
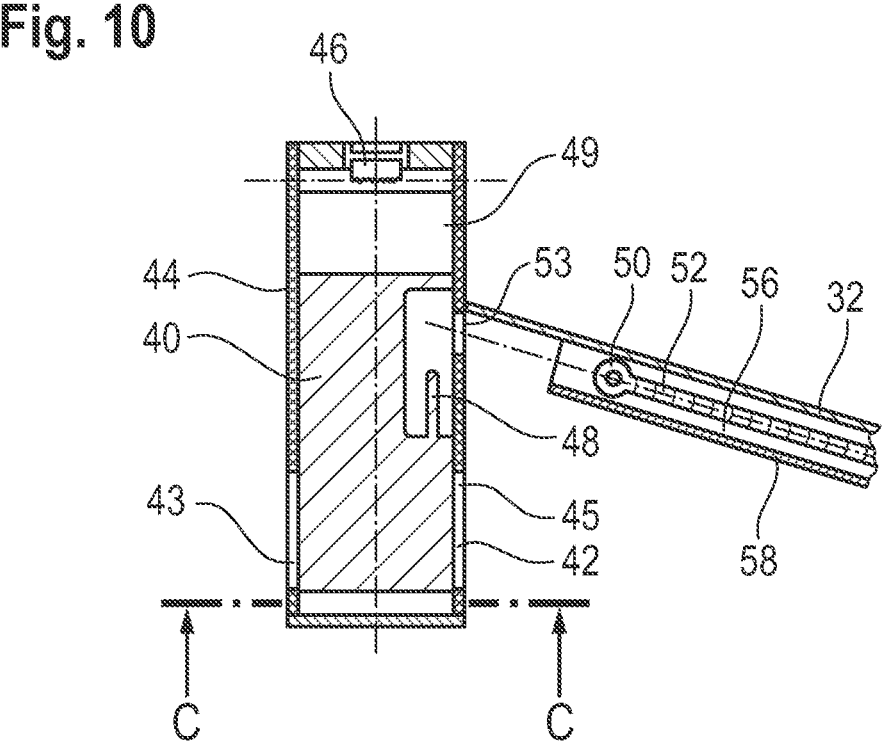
FIG. 10 shows a partial view of the airbag module corresponding to FIG. 6 in the second state.

FIG. 10 illustrates the actuator 40 supported in the cylinder 44 in the release position. That is, the secondary gas generator 46 has been triggered and moved the actuator 40 into the release position.

The FIGS. 10, 11, 12 and 13 here correspond to the FIGS. 6, 7, 8 and 9.

Figure 11:
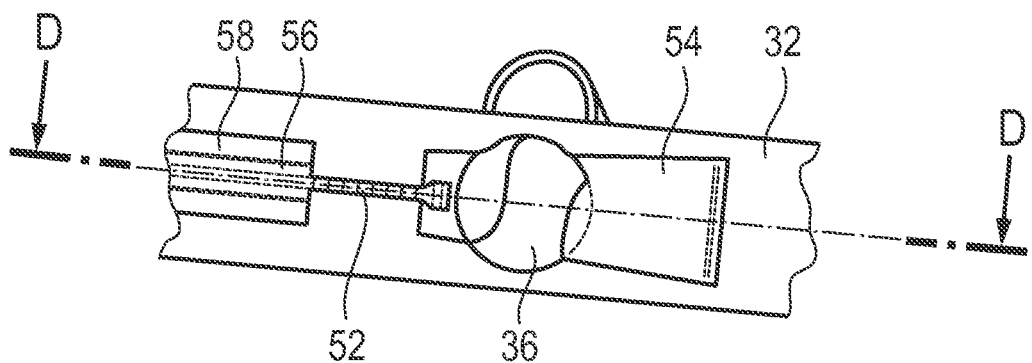
FIG. 11 shows a partial view of the airbag module corresponding to FIG. 7 in the second state.
Figure 12:
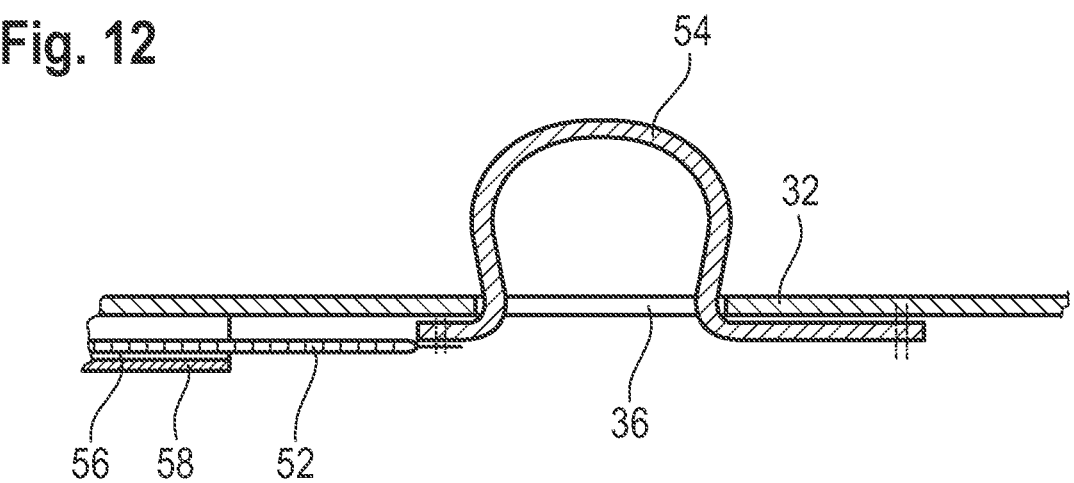
FIG. 12 shows a section along the line D-D in FIG. 11.

For further illustration, FIG. 12 shows a section along the line D-D of FIG. 11.

Figure 13:
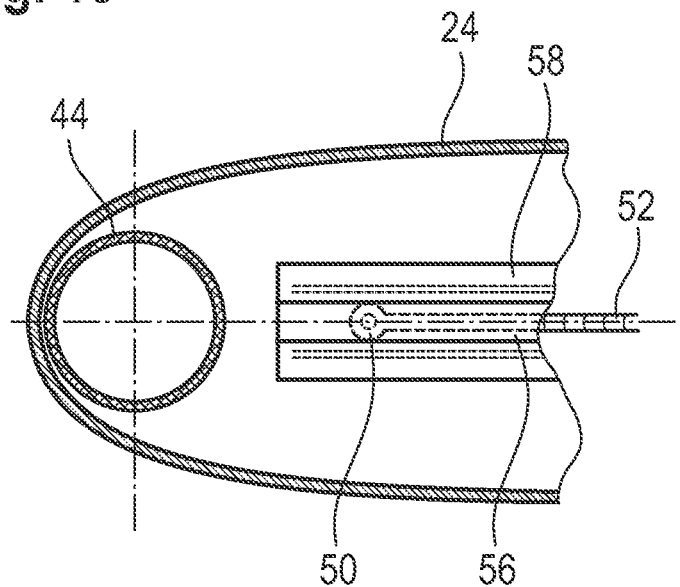
FIG. 13 shows a section along the line C-C in FIG. 10.

FIG. 13 shows a section along the line C-C in FIG. 10.

The pin 48 has been moved out of the eyelet 50 of the tether 52 by the movement of the actuator 40 so that the tether 52 and, consequently, the material layer 54, is no longer maintained tensioned by the actuator 40 and, resp., by the pin 48.

In an alternative embodiment, it is imaginable that the tether 52 is fastened to the actuator 40 and, when the actuator 40 is adjusted, is sheared off the latter.

FIG. 10 shows the tether 52 in a position in which it has already been drawn a little into the guide passage 56.

In addition, in the release position the outlet opening 42 is closed by the actuator 40 so that no gas can flow out of the first chamber 26.

The pressure building up in the first chamber 26 helps press the material layer 54 through the overflow opening 36 in the partition 32, as shown in FIG. 11, thus allowing the fluid communication from the first chamber 26 to the second chamber 28 to be released.

This is possible because the tether 52 is no longer maintained tensioned and can be drawn through the guide passage 56 by the material layer 54.

Figure 14:
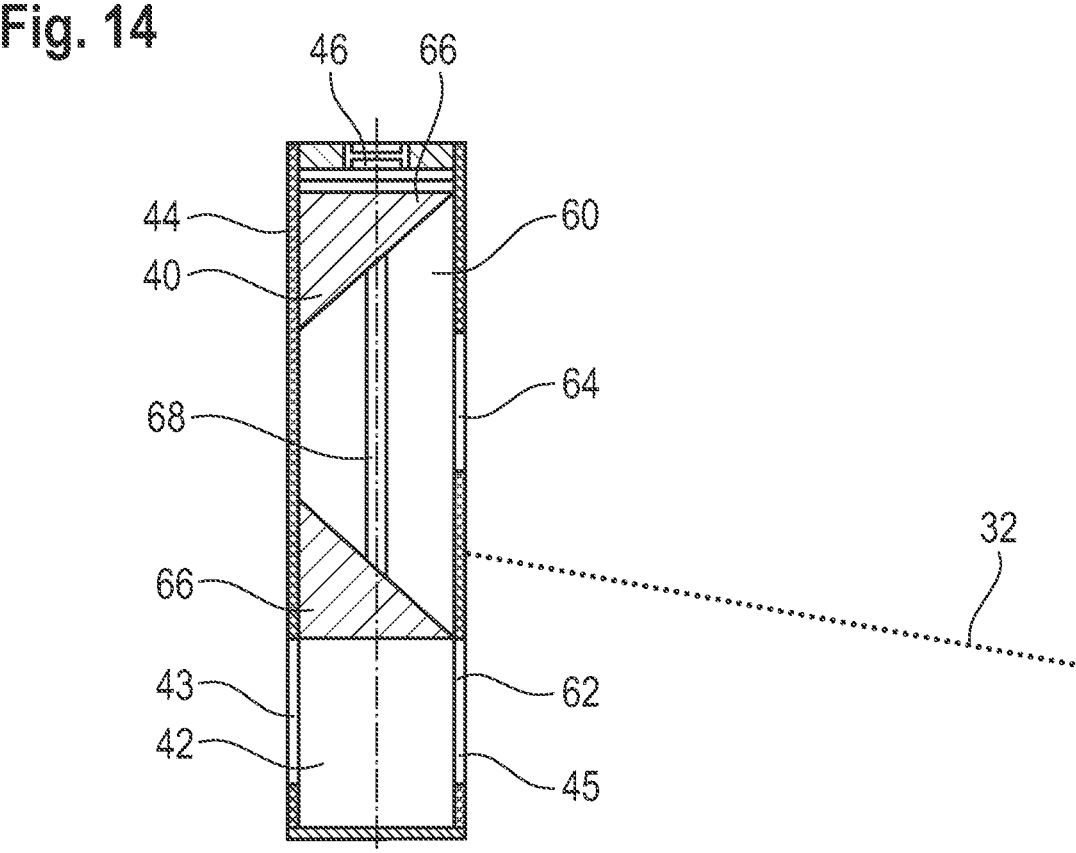
FIG. 14 shows a partial view of a second embodiment of an airbag module according to the invention in the first state.

In FIGS. 14 and 15, a second embodiment of the airbag module 10 according to the invention is illustrated. Accordingly, FIG. 14 illustrates a state in which the fluid communication between the first chamber 26 and the second chamber 28 is blocked, and FIG. 15 illustrates a state in which the fluid communication between the first chamber 26 and the second chamber 28 is released.

The embodiment illustrated in FIGS. 14 and 15 differs from the embodiment according to FIGS. 6 to 13 in that the fluid communication between the first chamber 26 and the second chamber 28 is realized via a recess 60 in the actuator 40 by the cylinder 44, the recess 60 constituting the overflow opening 36.

The additional material layer 54 and the tether 52 thus may be dropped and the partition 32 is designed to be tight.

The cutout 60 preferably has no cylindrical shape but is beveled at their front- side ends, in particular at 45°, as shown in FIGS. 14 and 15. The bevel extends such that the recess 60 becomes narrower in the direction away from the chambers 26, 28. This offers advantages as regards the space required for the airbag module 10. In addition, the flow resistance when the gas flows from the first chamber 26 to the second chamber 28 is reduced by the bevel.

The functioning of the airbag module 10 according to FIGS. 14 and 15 substantially corresponds to the functioning of the airbag module 10 according to FIGS. 6 to 13, however.

That is, by triggering the secondary gas generator 46, the actuator 40 is moved from the blocking position as illustrated in FIG. 14 to the release position as illustrated in FIG. 15.

In the blocking position, the outlet opening 42 is opened and the fluid communication from the first chamber 26 to the second chamber 28 is blocked. In the release position, the outlet opening 42 is closed and the fluid communication from the first chamber 26 to the second chamber 28 is released.

In order to fluidically connect the first chamber 26 to the second chamber 28, the cylinder includes a first opening 62 which opens into the first chamber 26 and a second opening 64 which opens into the second chamber 28. The first opening 62 is simultaneously part of the outlet opening 42.

If the actuator 40 is in the release position, the openings 62, 64 are fluidically connected to each other via the recess 60 so that gas may flow from the first chamber 26 through the cylinder 44 into the second chamber 28.

The opening 43 of the outlet opening 42 is closed, due to the bevel of the recess 60 at its front-side ends, while the opening 64, 65 facing the first chamber 26 and being disposed to be aligned with the opening 43 is open.

The actuator 40 shown in FIGS. 14 and 15 may be fabricated from plural parts. For example, the actuator 40 is made from two cylinder wedges 66 and a rod- shaped member 68 connecting the cylinder wedges 66. As an alternative, the actuator 40 may be an injection-molded part made in one piece that takes the shape of a cylinder including a recess.

The invention claimed is:

1. An airbag module for a restraint device , comprising a seat-integrated side airbag, a slidable actuator, and an outlet opening,
    wherein the airbag comprises a shoulder chamber and a head chamber which are separated by a partition and fluidically connected to each other via an overflow opening that provides fluid communication from the shoulder chamber to the head chamber through the partition, the overflow opening comprising a material layer having a tensioned condition configured to cover and seal the overflow opening so that only the shoulder chamber inflates, and a released condition configured to uncover the overflow opening to provide fluid communication between the shoulder chamber and head chamber so that both the shoulder chamber and head chamber inflate,
    wherein the outlet opening has an open condition for allowing gas to flow out of the airbag, and a closed condition for blocking gas from flowing out of the airbag,
    wherein the actuator has a blocking position in which the material layer is held in the tensioned condition and the outlet opening is placed in the open condition, the blocking position being configured to inflate only the shoulder portion, the actuator having a release position in which the material layer is placed in the released condition and the outlet opening is placed in the closed condition, the release position being configured to inflate both the shoulder portion and head.

2. The airbag module according to claim 1, wherein the material layer is connected to the actuator via a tether and is maintained tensioned by the tether, if the actuator is in the blocking position.

3. The airbag module according to claim 2, wherein the tether is detached from the actuator, if the actuator is in the release position.

4. The airbag module according to claim 2, wherein on the actuator a pin is provided which, in the blocking position, engages in an eyelet of the tether and thus holds and tightens the tether.

5. The airbag module according to claim 1, wherein a recess which constitutes the fluid communication is provided in the actuator.

6. The airbag module according to claim 5, wherein the airbag module includes a cylinder in which the actuator is movably arranged, the cylinder having a first opening which opens into the shoulder chamber and having a second opening which opens into the head chamber, wherein the recess fluidically connects the openings to each other in the release position of the actuator.

7. The airbag module according to claim 1, wherein the airbag module has an outlet opening, wherein the outlet opening is opened if the actuator is in the blocking position, and wherein the outlet opening is closed by the actuator if the actuator is in the release position.

8. The airbag module according to claim 1, wherein the airbag module has a gas generator which is fluidically connected to the first chamber.

9. The airbag module according to claim 1, wherein a secondary gas generator is provided to shift the actuator from the blocking position to the release position.

10. The airbag module according to claim 1, wherein the actuator is configured to be placed in the blocking position in response to an upright condition of the vehicle seat, and is configured to be placed in the release condition in response to a reclined condition of the vehicle seat.

11. A vehicle safety system comprising the airbag module according to claim 1 and a curtain airbag, wherein the actuator is configured to be placed in the blocking position in response to a detected vehicle condition in which the head chamber, if inflated, would interfere with the curtain airbag, and wherein the actuator is configured to be placed in the release condition in response to a detected vehicle condition in which the head chamber, if inflated, would not interfere with the curtain airbag.

12. A side airbag module for a restraint device, comprising:
- a side airbag comprising a shoulder chamber and a head chamber separated by a partition and fluidically connected to each other via an overflow opening that provides fluid communication from the shoulder chamber to the head chamber through the partition, the overflow opening having a closed condition configured to cover and seal the overflow opening so that only the shoulder chamber inflates, and an open condition configured to uncover the overflow opening to provide fluid communication between the shoulder chamber and head chamber so that both the shoulder chamber and head chamber inflate; and
- an actuator having a first condition configured to hold the overflow opening in the closed condition so that only the shoulder portion is inflated in response to a crash, and a second condition configured to release the overflow opening to the open condition so that both the shoulder portion and head portion are inflated in response to a crash.

* * * * *